United States Patent
Lipka et al.

(10) Patent No.: US 8,107,223 B2
(45) Date of Patent: Jan. 31, 2012

(54) ASYMMETRIC ELECTROCHEMICAL SUPERCAPACITOR AND METHOD OF MANUFACTURE THEREOF

(75) Inventors: Stephen M. Lipka, Nicholasville, KY (US); John R. Miller, Shaker Heights, OH (US); Tongsan D. Xiao, Willington, CT (US); Jinxiang Dai, Storrs, CT (US)

(73) Assignee: U.S. Nanocorp, Inc., Farmington, CT (US)

( * ) Notice: Subject to any disclaimer, the term of this patent is extended or adjusted under 35 U.S.C. 154(b) by 366 days.

(21) Appl. No.: 12/511,568

(22) Filed: Jul. 29, 2009

(65) Prior Publication Data

US 2009/0290287 A1 Nov. 26, 2009

Related U.S. Application Data

(63) Continuation-in-part of application No. 11/711,376, filed on Feb. 27, 2007, now Pat. No. 7,576,971, which is a continuation-in-part of application No. 09/590,496, filed on Jun. 9, 2000, now Pat. No. 7,199,997.

(60) Provisional application No. 60/138,857, filed on Jun. 11, 1999.

(51) Int. Cl.
*H01G 9/00* (2006.01)

(52) U.S. Cl. ........ 361/502; 361/503; 361/504; 361/512; 361/516; 361/517

(58) Field of Classification Search .................. 361/502, 361/503–504, 509, 512, 516–519, 523–525, 361/528–529
See application file for complete search history.

(56) References Cited

U.S. PATENT DOCUMENTS

| | | |
|---|---|---|
| 4,313,084 A | 1/1982 | Hosokawa et al. |
| 4,697,224 A | 9/1987 | Watanabe et al. |
| 4,820,599 A | 4/1989 | Furukawa et al. |
| 5,077,150 A | 12/1991 | Yoneda |
| 5,085,955 A | 2/1992 | Cipriano et al. |
| 5,322,746 A | 6/1994 | Wainwright et al. |
| 5,362,579 A | 11/1994 | Rossoll et al. |
| 5,378,599 A | 1/1995 | Randell et al. |

(Continued)

OTHER PUBLICATIONS

Lipka, S.S., Application of Carbon Fiber Materials for Double Layer Capacitors, (Presented at 3rd Interrnational Seminar as Double Layer Capacitors and Energy Storage, Dec. 6-8, 1993, Deerfield Beach, FL).

(Continued)

*Primary Examiner* — Nguyen T Ha
(74) *Attorney, Agent, or Firm* — Cantor Colburn LLP

(57) ABSTRACT

The disclosure relates to asymmetric supercapacitors containing: a positive electrode comprising a current collector and a first active material selected from a layered double hydroxide of formula $[M^{2+}_{1-x}M^{3+}_x(OH)_2]A^{n-}_{x/n} \cdot mH_2O$ where $M^{2+}$ is at least one divalent metal, $M^{3+}$ is at least one trivalent metal and A is an anion of charge n−, where x is greater than zero and less than 1, n is 1, 2, 3 or 4 and m is 0 to 10; $LiCoO_2$; $LiCo_xNi_yO_2$ where x and y are greater than zero and less than 1; $LiCo_xNi_yM_{n(1-x-y)}O_2$ where x and y are greater than zero and less than 1; $CoS_x$ where x is from 1 to 1.5; MoS; Zn; activated carbon and graphite; a negative electrode containing a material selected from a carbonaceous active material, $MoO_3$ and $Li_{1-x}MoO_{6-x/2}$; an aqueous electrolyte solution or a non-aqueous ionic conducting electrolyte solution containing a salt and a salt and a non-aqueous solution; and a separator plate. Alternatively, the electrolyte can be a solid electrolyte.

24 Claims, 8 Drawing Sheets

U.S. PATENT DOCUMENTS

| | | | |
|---|---|---|---|
| 5,392,191 A | 2/1995 | Thomas et al. | |
| 5,415,959 A | 5/1995 | Pyszczek et al. | |
| 5,419,977 A | 5/1995 | Tennent et al. | |
| 5,599,644 A | 2/1997 | Swierbut et al. | |
| 5,600,535 A | 2/1997 | Jow et al. | |
| 5,713,561 A | 2/1998 | Sugiyama | |
| 5,902,696 A | 5/1999 | Smesko et al. | |
| 5,920,455 A | 7/1999 | Shah et al. | |
| 5,923,525 A | 7/1999 | Belyakov et al. | |
| 5,953,204 A | 9/1999 | Suhara et al. | |
| 5,961,887 A | 10/1999 | Zheng et al. | |
| 5,963,417 A | 10/1999 | Anderson et al. | |
| 5,986,876 A | 11/1999 | Stepanov et al. | |
| 5,986,878 A | 11/1999 | Li et al. | |
| 6,031,711 A | 2/2000 | Tennent et al. | |
| 6,036,774 A | 3/2000 | Lieber et al. | |
| 6,048,645 A | 4/2000 | Saidi et al. | |
| 6,097,587 A | 8/2000 | Inagawa et al. | |
| 6,162,530 A | 12/2000 | Xiao et al. | |
| 6,181,546 B1 * | 1/2001 | Stepanov et al. | 361/502 |
| 6,198,623 B1 | 3/2001 | Amatucci et al. | |
| 6,222,723 B1 | 4/2001 | Razoumov et al. | |
| 6,410,181 B1 | 6/2002 | Spillman et al. | |
| 6,621,684 B2 * | 9/2003 | Shimamoto et al. | 361/502 |
| 7,199,997 B1 | 4/2007 | Lipka et al. | |
| 7,316,864 B2 * | 1/2008 | Nakayama et al. | 429/217 |
| 7,567,429 B2 * | 7/2009 | Mori et al. | 361/502 |
| 7,847,328 B2 * | 12/2010 | Kiyomura | 257/296 |
| 7,914,704 B2 * | 3/2011 | Yamakawa et al. | 252/500 |

OTHER PUBLICATIONS

Beliakov, A. I., et al., Development and Application of Combined Capacitors: Double Electric Layer-Pseudocapacity, (Presented to the 7th International Seminar on double Layer Capacitors and Similar Energy Storage Devices, Dec. 8-11, 1997, Deerfield Beach, FL).

Varalin, I.N. et al, Nickel-plated fiber electrodes for batteries and electrochemical capacitors (Presented at the 16th International Seminar & Exhibit on Primary & Secondary Batteries, Mar. 1-4, 1999, Fort Lauderdale, FL).

Varakin, I.N. et al, Application of Ultrascapacitors as Traction Energy Source, (Presented at the International Seminar on Double Layer Capacitors and Similar Energy Storage Devices, Dec. 8-10, 1997, Deerfield Beach, FL).

Beliakov, Alex I., et al. Power Performances of High Energy Destiny Caoacitors on System Carbon/Nickel Oxide, (Presented at the 9th International Seminar on Double Layer Capacitors and Similar Energy Storage Devices, Dec. 6-8, 1999, Deerfield Beach, FL).

* cited by examiner (a)

(b)

ASYMMETRIC ELECTROCHEMICAL SUPERCAPACITOR AND METHOD OF MANUFACTURE THEREOF

CROSS-REFERENCE TO RELATED APPLICATION

This application is a continuation-in-part of, and claims priority to U.S. application Ser. No. 11/711,376, filed Feb. 27, 2007 which is a continuation-in-part of, and claims priority to, U.S. patent application Ser. No. 09/590,496, filed Jun. 9, 2000, which claims priority to U.S. Provisional Application No. 60/138,857, filed Jun. 11, 1999, all of which are incorporated by reference herein in their entirety.

STATEMENT OF GOVERNMENT INTEREST

The invention was made with Government support under contract NAS 3-99054 awarded by the National Aeronautics and Space Agency. The Government has certain rights in the invention.

FIELD OF THE INVENTION

The present invention relates to electrochemical capacitors. In particular, the present invention relates to asymmetric electrochemical capacitors and methods to improve their energy density and power density.

BRIEF DESCRIPTION OF THE RELATED ART

Electrochemical capacitors (ECs) can store several hundred times more energy per unit weight (gravimetric energy density) and volume (volumetric energy density) than traditional electrolytic capacitors. Hereinafter energy density refers to both gravimetric and volumetric energy density. Additional advantages of ECs include high cycle life (>300 k), high discharge rates (from minutes to milliseconds), safety tolerance to high rate charge, discharge, and overcharge, wide operating temperatures and good state-of-charge indication during charge and discharge. In many cases ECs can exceed the performance of batteries in applications requiring high power density and discharge rates that are in the minutes to seconds range, such as those encountered in pulse discharge applications.

Applications for asymmetric electrochemical capacitors include memory backup devices for computers, digital-clock backup in appliances and military electronics, defibrillators, power supplies (UPS), portable electronics, telephone communication systems, portable x-ray unit power sources, and remote telemetry power sources. Automotive applications include load-leveling in electric vehicles to extend the life of the battery, and to provide power for acceleration, automobile starting, lighting and ignition (SLI), automotive power steering, preheating catalytic converters, and pulse power needs such as power door locks and power windows.

Electrochemical double layer capacitors, also known as supercapacitors, store energy by the charging of the electrode/electrolyte interface (double layer capacitance) or through faradaic reactions (pseudo-capacitance) occurring at or near the electrode surface. The active materials presently under investigation as electrode materials for these devices include activated carbons (typically having surface areas in the range of 1000-3000 m$^2$/g), mixed metal oxides (e.g. ruthenium oxide and iridium oxide) and doped conductive polymers such as polypyrrole and polyaniline. Both aqueous and non-aqueous electrolytes have been used.

Symmetric supercapacitors employ materials having approximately the same level of response to an applied voltage for both electrodes whereas asymmetric supercapacitors utilize two different materials, each having a differing magnitude of response to an applied voltage, for the electrodes. Alternatively symmetric supercapacitors can be described as those employing the same mechanism of energy storage at both electrodes and asymmetric supercapacitors can be described as those employing different mechanisms of energy storage at each electrode. Mechanisms of energy storage include charge separation and faradaic processes (electron transfer).

Supercapacitors possess very high power densities, but low energy densities when compared to batteries. Various approaches have been investigated to increase the energy density of supercapacitors without affecting the high power performance. One approach has been to use non-aqueous electrolytes to increase the operating voltage of the supercapacitor and thus the stored energy. Operating voltages of commercial supercapacitors such as those developed by Panasonic having non-aqueous electrolytes are at values of up to 2.5 volts (V).

A second approach for increasing the energy density of supercapacitors has been to use conducting-polymer electrodes, for instance fluorophenyl thiophene, in both electrodes. These systems operate at approximately 2.8 V. At its present state of development, energy density projections for practical devices are in the range from 6-10 Watt*hours/kilogram (Wh/kg) at power levels of about 2 kilowatts/kilogram (kW/kg), but long-term stability and cycle life remain unclear. This approach requires use of very high purity materials and processes due to the high cell operating voltage, thus adding to the supercapacitor cost.

A third approach for increasing supercapacitor energy density has been to use pseudo-capacitor electrode materials, for example, mixed-oxide systems based on ruthenium oxide and iridium oxide. Generally, most pseudo-capacitor materials require an aqueous electrolyte, which limits cell voltages to about 1.2 V. The increased energy density in these systems is not due to the higher voltage, but rather use of pseudo-capacitive and double layer charge storage on high-surface-area electrodes. Significant (two-fold) energy density increases have been reported recently through the use of hydrated ruthenium oxide electrodes. This apparently allows bulk as well as surface charge storage. However, even with the doubling of energy density, ruthenium-based approaches are prohibitively expensive for automotive applications. For example, in a hybrid vehicle application, raw material costs alone for this approach are well in excess of 100,000.

Low-cost substitutes for the ruthenium-based system have been sought, for example oxides, nitrides, and sulfides of metals such as molybdenum and tungsten. Again, all of these materials require aqueous electrolytes for pseudo-capacitive charge storage. The operating voltage of such materials has been disappointingly low, in the range of 0.6 to 0.8 V for stable operation. This greatly reduces the materials' energy and power density. The materials also remain relatively high cost, especially compared to other supercapacitor materials such as activated carbon, which can offer comparable performance.

U.S. Pat. No. 5,986,876 discloses an asymmetric supercapacitor. In this design, a nickel oxyhydroxide (NiOOH) positive electrode is coupled with an activated carbon negative electrode and a potassium hydroxide (KOH) electrolyte. An asymmetric supercapacitor offers energy density advantages for several reasons. First, the device capacitance is almost equal to the capacitance of the electrode having the smallest capacitance, since $1/C_T=1/C_1+1/C_2$. This is because the other electrode is comprised of material having much higher specific capacity. In contrast, the capacity ratio for a symmetric supercapacitor is about 1, yielding a device capacitance about one-half that of each electrode. Secondly, because one electrode material has such high capacity, its mass and volume can be much smaller than the other electrode. The high-capacity electrode can thus have negligible mass or volume compared to the other electrode, which further increases the energy density of the asymmetric supercapacitor. Lastly, an asymmetric supercapacitor with aqueous electrolyte can reliably operate at voltages above 1.22 V without gas evolution. For example, known asymmetric supercapacitors can operate at 1.7 to 1.8 V, almost double that of commercially available symmetric aqueous supercapacitors. This higher voltage provides almost a four-fold increase in energy density. These three factors can combine to increase the energy density of an asymmetric supercapacitor to eight or more times that of a symmetric supercapacitor.

While the previously discussed improvements are significant, there nonetheless remains a need in the art for improved asymmetric supercapacitors having higher densities, high power performance and long life.

SUMMARY OF THE INVENTION

The above described drawbacks and disadvantages are overcome or alleviated by the asymmetric supercapacitors disclosed herein. According to one embodiment, an asymmetric supercapacitor comprises:

a positive electrode comprising a current collector and a first active material selected from the group consisting of a layered double hydroxide of formula $[M^{2+}_{1-x}N^{3+}_x(OH)_2]A^{n-}_{x/n}\cdot mH_2O$ where $M^{2+}$ is at least one divalent metal, $N^{3+}$ is at least one trivalent metal/non-metal, A is an anion of charge n– and x and y are greater than zero and less than 1; $LiCoO_2$, $LiCo_xNi_yO_2$ and $LiCo_xNi_yMn_{1-x-y}O_2$ where x and y are greater than zero and less than 1; sulfides of formula $MS_x$ where x is from 1 to 10 and M is at least one selected from the group consisting of Co, Ni, Fe, Cu, Ag, Mo and W; $Li_xCo_y(PO_4)_z$ and $Li_xNi_y(PO_4)_z$ where x, y and z are greater than zero and less than 1; activated carbon and graphite and a combination comprising at least one of the foregoing active materials:

a negative electrode comprising at least one material selected from the group consisting of a carbonaceous active material, Zn, Al, Mg, Ca, Cr, La, V, Ti, Li, Na; a metal oxide of formula $MO_x$ where $0<x<3$ and M is at least one selected from the group consisting of Ti, V, Nb, Cr, Mo, W, Mn, Fe, Co, Ni, Pd, Pt, Cu and Ag; a sulfide of formula $MS_x$, where x is from 1 to 10 and M is at least one selected from the group consisting of Co, Ni, Fe, Cu, Ag, Mo and W; $Li_xMoO_{(6-x)/2}$ where x and y are greater than zero and less than 1; and a conductive polymer:

an aqueous electrolyte solution selected from the group consisting of aqueous solutions of hydroxides of alkali metals, aqueous solutions of carbonates of alkali metals, aqueous solutions of chlorides of alkali metals, aqueous solutions of bromides of alkali metals, aqueous solutions of iodides of alkali metals, aqueous solutions of sulfates of alkali metals, aqueous solutions of nitrates of alkali metals, and a combination comprising at least one of the foregoing aqueous solutions; or a non-aqueous ionic conducting electrolyte solution containing a salt and a non-aqueous solution:

and a separator plate.

In another embodiment, an asymmetric supercapacitor comprises: a positive electrode comprising a current collector and a first active material; a negative electrode; a solid electrolyte; and a separator plate.

The asymmetric supercapacitors have improved energy density by electrically coupling a positive electrode of high faradaic capacity with a negative electrode that stores charge through charge separation at the electric double-layer such as one comprising carbon. The asymmetric supercapacitors also improve power density by using high surface area nanostructured electrode materials.

The asymmetric supercapacitor offers other practical advantages in addition to higher energy density. The capacitance of the asymmetric supercapacitor is close to the capacitance of the double layer electrode capacitance because the positive electrode is generally many times larger in capacitance. Moreover, the asymmetric supercapacitor is less expensive since only one of its electrodes is activated carbon, typically the highest cost material. Further, the voltage balance in a series-string of aqueous electrolyte asymmetric cells can be less problematic than in symmetric cells because these cells can successfully operate on a gas cycle during overcharge conditions. Thus on charging, the highest voltage cell reaches gassing conditions first and ceases to rise in voltage, allowing the other cells to be charged to this exact same voltage. Therefore, the cells in a series string can be equalized in voltage every time the system is fully charged. Consequently, cell voltage de-rating as seen in symmetric cells is unnecessary and in fact usually undesirable. This creates an opportunity to realize the maximum available energy and power densities along with the minimum possible cost.

DETAILED DESCRIPTION OF THE PREFERRED EMBODIMENTS

An asymmetric supercapacitor is disclosed herein which includes a positive electrode comprising a current collector and an active material, a negative electrode and an electrolyte that may be in the form of a solid, an aqueous solution, or a non-aqueous solution.

The asymmetric supercapacitor has improved energy density by electrically coupling a positive electrode of high faradaic capacity with a negative electrode that stores charge through charge separation at the electric double-layer such as a negative electrode comprised of carbon. The asymmetric supercapacitor also improves power density by using high surface area nanostructured electrode materials.

Figure 1:
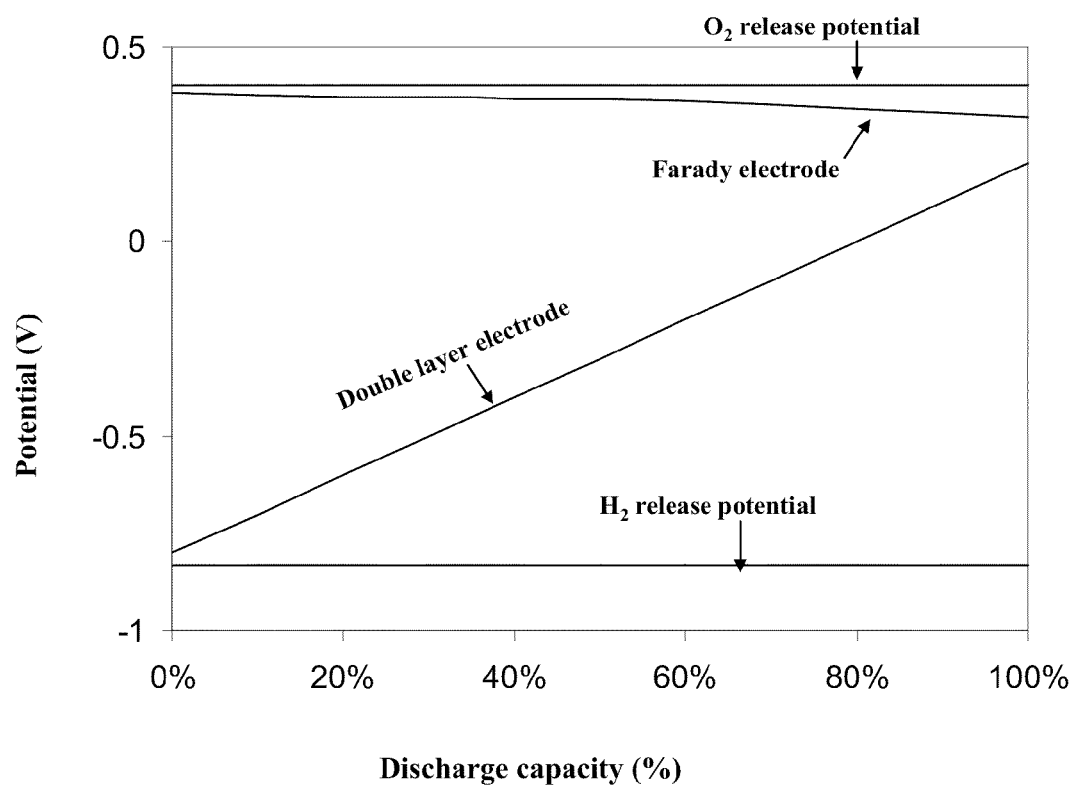
FIG. 1 is a schematic representation of the change in potential at each electrode during charge and discharge.

In order for the electrochemical couple, i.e. the positive and negative electrodes, to obtain high energy density, one of the electrodes, the positive electrode in the instant case, must have a low degree of polarization; the potential of the electrode changes little from its reversible potential during the passage of current. Additionally, non-faradaic processes must be minimized and faradaic processes (electron transfer) occur across the electrode surface at a high reaction rate. The opposite electrode, the negative electrode, should possess a high degree of polarizability and under ideal conditions, should develop a large window of potential change during charge and discharge. Charge storage at the polarizable electrode is through double-layer charge separation. To illustrate, the change in potential occurring at each electrode during charge and discharge is shown schematically in FIG. 1. As can be seen, a large voltage window is developed as the asymmetric supercapacitor is charged. For an asymmetric device containing aqueous electrolyte, the potential window can be limited by hydrogen and oxygen gas evolution at the electrodes. The potential of the electrode with a low degree of polarization remains essentially unchanged during both the charge and discharge processes.

The asymmetric supercapacitor offers other practical advantages in addition to higher energy density. The capacitance of the asymmetric supercapacitor is close to the capacitance of the double layer electrode capacitance because the positive electrode is generally many times larger in capacitance. Moreover, the asymmetric supercapacitor is less expensive since only one of its electrodes is activated carbon, typically the highest cost material. Further, the voltage balance in a series-string of aqueous electrolyte asymmetric cells can be less problematic than in symmetric cells because these cells can successfully operate on a gas cycle during overcharge conditions. Thus on charging, the highest voltage cell reaches gassing conditions first and ceases to rise in voltage, allowing the other cells to be charged to this exact same voltage. Therefore, the cells in a series string can be equalized in voltage every time time the system is fully charged. Consequently, cell voltage de-rating as seen in symmetric cells is unnecessary and in fact usually undesirable. This creates an opportunity to realize the maximum available energy and power densities along with the minimum possible cost.

Examples of suitable active materials for the positive electrode include a layered double hydroxide of formula $[M^{2+}_{1-x}N_x^{3+}(OH)_2]A^{n-}_{x/n} \cdot mH_2O$ where $M^{2+}$ is at least one divalent metal, $N^{3+}$ is at least one trivalent metal/non-metal and A is an anion of charge n–, where x and y are greater than zero and less than 1 and n is 1, 2, 3, or 4; $LiCoO_2$ $LiCo_xNi_yO_2$ and $LiCo_xNi_yMn_{(1-x-y)}O_2$ where x and y are greater than zero and less than 1; sulfides of formula $MS_x$ where x is from 1 to 10 and M is at least one selected from the group consisting of Co, Ni, Fe, Cu, Ag, Mo and W; $Li_xCo_y(PO_4)_z$ and $Li_xNi_y(PO_4)_z$ where x, y and z are greater than zero and less than 1; activated carbon and graphite and a combination comprising at least one of the foregoing active materials.

The layered double hydroxide may contain any number of $M^{2+}$ and $N^{3+}$ metals. Typically 2 to 5 metals are utilized. The metals $M^{2+}$ and $N^{3+}$ are not limited and can include alkali earth metals, transition metals, main group metals and lanthanide metals. Divalent $M^{2+}$ metals can include $Ca^{2+}$, $Mg^{2+}$, $Mn^{2+}$, $Fe^{2+}$, $Co^{2+}$, $Ni^{2+}$, $Cu^{2+}$ and $Zn^{2+}$. Trivalent $N^{3+}$ metals can include $B^{3+}$, $Al^{3+}$, $Mn^{3+}$, $Fe^{3+}$, $Co^{3+}$, $Ni^{3+}$, $Cr^{3+}$, $Ga^{3+}$, $Y^{3+}$, $La^{3+}$ and $Ti^{3+}$. The anion $A^{n-}$ is not limited and can include $HCO_3^-$, $CO_3^{2-}$, $NO_3^{2-}$, $SO_3^{2-}$, $SO_4^{2-}$, $F^-$, $Cl^-$, $Br^-$, $I^-$, $PO_4^{3-}$ and tetrasodium ethylenediaminetetraacetate ($Na_4EDTA$).

The active material is typically in particulate form, the particles of which have a mean single linear dimension of less than about 100 micrometers that is preferably nanostructured. The particular form of the active material will depend on the desired performance, cost, and other characteristics of the asymmetric supercapacitor. It is contemplated that a wide variety of forms may be used. For example, the active material may take the form of both irregular and regular shapes, such as amorphous, fibrous, spheroidal, rhomboidal and the like, bird's nest, nanotubes or nanorods as disclosed in U.S. Pat. No. 6,036,774, and the other forms described in U.S. Pat. No. 6,162,530, these patents being incorporated by reference herein. Nanostructured materials are well suited for use in electrodes because they have extremely high surface activity and high accessible surface area. This is in contrast to other high surface area materials in which much of the surface area is contained in deep micropores and thus is largely non-utilizable in capacitor applications. As used herein a nanostructured material refers to materials having a grain size on the order of 1 to 100 nanometers (where 1 nm=10 angstroms). Nanostructured materials are thus characterized by having a high fraction of the material's atoms residing at grain or particle boundaries. For example, with a grain size in the five nanometer range, about one-half of the atoms in a nanocrystalline or a nanophase solid reside at grain or particle interfaces.

The nanostructured materials described above may be produced by an aqueous chemical solution method comprising providing an aqueous starting solution and an aqueous reactant solution, at least one of which comprises at least one precursor metal salt; and a base solution.

The nanostructured powders may be aged or heat-treated for a length of time effective to transform the completely or partially or crystalline nanostructured powders into the desired crystalline state. This procedure serves to stabilize the nanocrystal structure. Process parameters, which affect the morphology and yield of the nanocrystalline powder product, include temperature of heating, time of heating, and solution pH.

After aging or heat-treating, the nanocrystalline powders are generally isolated by filtration and washed to remove by-products, preferably using deionized, distilled water or other suitable solvent.

Current collectors are well known in the art. They may comprise any conductive material with electrochemical stability in the supercapacitor environment. Examples of such materials include, but are not limited to, metal foil, metal mesh, electrically conductive polymers, electrically conductive polymer composites, and expanded metals. The current collector may be porous or non-porous as desired. The thickness of the current collector must be sufficient to provide current collection to all active material in the electrode uniformly and provide sufficient rate performance (i.e. sustain current performance). Current collectors generally have a thickness of about 10 micrometers to about 75 micrometers.

The active material may be applied to the current collector by any method known in the art. One such method is known as pasting. The active material is mixed with a binder to form a slurry and then applied to the current collector. Examples of binders include, but are not limited to, PVDF and fibrillated PTFE. If the binder is a solid then it is first dissolved in a suitable solvent and then following application to the current collector the solvent is evaporated. The choice of binder is dependent upon the active material and the choice of solvent is dependent upon the choice of binder. The selection of binder and solvent are readily determined without undue experimentation by one of ordinary skill in the art.

The electrodes can be formed by thermal spraying onto the current collector. Thermal spray techniques are disclosed in U.S. application Ser. No. 09/485,424, now U.S. Pat. No. 5,599,644, which is herein incorporated by reference. The preparation of a nanostructured thermal spray feedstock is described here. A suspension of nanocrystalline particles is subjected to ultrasonication using an intense ultrasonic probe. Ultrasonication disintegrates any powder aggregates and introduces lattice defects into the nanocrystalline particles. These defects can exert an important influence on the performance of nickel hydroxide, for example, when it is used as the active material in a nickel electrode. Parameters, which affect the final product, include ultrasonic power and processing time.

The final step of thermal spray feedstock preparation is generally spray-drying of the ultrasonicated nanoparticle suspension to produce nanoporous spherical powder agglomerates. This procedure produces agglomerates of nanostructured particles, wherein the agglomerates have diameters in the range from about 0.1 to 200 micrometers, preferably from about 1 to 100 micrometers, and most preferably about 20 micrometers. During spray-drying, rapid evaporation occurs as the spray droplets contact the hot air stream to produce a saturated vapor film. Continued evaporation depends on the diffusion rate of the moisture through the surface shell. As the shell thickness increases with time there is a corresponding decrease in the evaporation rate. Since evaporation is an endothermic process, the droplet surface remains cool until the evaporation is complete, even though the gas stream can be fairly hot. Use of aerosol spray-drying ensures that the end-product powder is free of undesirable phases that might be produced by heating above 200° C. Relevant processing parameters include the precursor delivery rate, inlet and outlet gas temperature, and suspension concentration.

Useful positive electrode thicknesses are about 10 micrometers to about 250 micrometers. Preferably the positive electrode thickness is less than about 50 micrometers.

Examples of suitable carbonaceous active materials for the negative electrode include, but are not limited to, carbon such as graphite, functionalized carbon such as graphitic nanofibers and nanotubes as disclosed in U.S. Pat. No. 6,031,711, which is incorporated by reference herein, carbon composites such as carbon coated with metals and metal oxides such as ruthenium oxide, and combinations comprising at least one of the foregoing active materials. The active material is particulate in nature with a mean particle radius of less than about 100 micrometers. The term particulate as used herein can include fibers. The fibers can be loose (discrete) fibers or in the form of a non-woven mat or a woven cloth. Also within the scope of the invention is a two dimensional sheet comprising a carbonized polymer. Useful fibers are less than about 10 micrometers in diameter. Nanofibrous materials, i.e., fibers with diameters less than 100 nm, are useful in electrodes due to their high surface area. Nanofibrous carbon with fiber diameters less than about 50 nm is contemplated to be more useful due to its higher surface area.

When the active material of the negative electrode comprises loose particulate material, it may be applied to the optional current collector by any method known in the art including pasting, as described above, and casting. In casting, a slurry of active material with an optional binder is cast into a film. The resulting film is applied to the current collector, preferably with an adhesive. If the active material is in the form of a non-woven mat, woven cloth, or two dimensional sheet, the active material may be applied to the current collector or simply put in close contact with the current collector in the supercapacitor. If the active material is in a form that can stand alone, it may serve the dual purpose of active material and current collector. The carbon active material must be activated and activation can be achieved by any method known in the art. The resulting electrodes are porous, with a porosity typically greater than about 80%. The porosity is especially important when employing liquid electrolytes as the pores allow for greater intimate contact between active material and electrolyte. Additionally, the electrode may be coated with a collection coating on the current collector side to improve current collection. The choice of coating is determined by the stability of the coating in conditions of the supercapacitor, especially with regard to corrosion by the electrolyte. For example, nickel coating is typically employed when potassium hydroxide is the electrolyte because nickel is relatively unaffected by the potassium hydroxide. Useful electrodes thicknesses are about 50 micrometers to about 375 micrometers.

The electrolytes can be solid or liquid. Examples of suitable solid electrolytes include, but are not limited to, polyacids such as isopolyacids and heteropolyacids as disclosed in U.S. Pat. No. 5,986,878, which is incorporated by reference herein. Liquid electrolytes can be aqueous or non-aqueous. Aqueous electrolytes can only sustain up to about 1-2 V of potential in the device before electrochemical decomposition of water occurs. This can be overcome by arranging individual capacitors in series or by using non-aqueous electrolytes, which can withstand up to ~3 V of applied potential. A suitable non-aqueous electrolyte is an organic or non-aqueous solvent containing an ion that can intercalate into the electrode surface. The ion can be an anion or cation, depending upon the active material of the electrode.

Other non-aqueous or organic electrolytes are also suitable if they meet the following criteria: (1) the applied potential at which the electrolyte decomposes ("breakdown voltage") is between 1V and 10V, (2) the conductivity of the electrolyte is sufficiently high to facilitate rapid electron transfer between electrodes, preferably in the range of 0.1 to 1000, preferably 0.1 to 500, milliSiemens/cm, and (3) the electrolyte has low or no ability to chelate the metal or to extract the metal from the thin film surface. The electrolyte should chelate or remove less than 5% and preferably less than 1% of the metal from the film surface.

Suitable aqueous electrolytes include aqueous solutions of hydroxides of alkali metals, carbonates of alkali metals, halides of alkali metals, nitrates of alkali metals, sulfuric acid, or mixtures thereof The electrolyte is chosen to match the composition of the electrodes so as to minimize the equivalent series resistance (ESR). Such a determination can be made without undue experimentation by one of ordinary skill in the art. The amount of electrolyte is determined by the size of the capacitor. The concentration of the electrolyte is concentration necessary to achieve maximum ionic conductivity at the operating temperature of the capacitor. The typical aqueous electrolyte concentration is typically about 25 weight percent (wt %) to about 45 wt %.

The separator comprises a thin, non-conductive, porous material. It can be composed of any material impervious to the conditions of the supercapacitor, namely exposure to electrical charge and electrolyte. Porosity is typically about 40% to about 87%. Preferably the porosity is about 65% to about 85%. Thickness is typically about 25 micrometers to about 75 micrometers. A preferred separator is CELGARD™ 3501 available from Hoechst Celanese Corp.

The asymmetric supercapacitor may be assembled from the above mentioned components in all ways known in the art. When the electrolyte is liquid the electrode materials must be soaked ("wet up") either before electrode construction or after electrode construction. The electrode material may undergo formation (activation) either prior to electrode construction, after electrode construction, or after supercapacitor assembly. When the electrolyte is solid it is disposed adjacent to the electrode. The electrode, electrolyte and current collector, when present, comprise a half cell. The separator is applied to one half cell and then the two half cells are mated and sealed, preferably by heat.

In order for the electrochemical couple, i.e. the positive and negative electrodes, to obtain high energy density, one of the electrodes, the positive electrode in the instant case, must have a low degree of polarization; the potential of the electrode changes little from its reversible potential during the passage of current. Additionally, non-faradaic processes must be minimized and faradaic processes (electron transfer) occur across the electrode surface at a high reaction rate. The opposite electrode, the negative electrode, should possess a high degree of polarizability and under ideal conditions, should develop a large window of potential change during charge and discharge. Charge storage at the polarizable electrode is through double-layer charge separation. To illustrate, the change in potential occurring at each electrode during charge and discharge is shown schematically in FIG. 1. As can be seen, a large voltage window is developed as the asymmetric supercapacitor is charged. For an asymmetric device containing aqueous electrolyte, the potential window can be limited by hydrogen and oxygen gas evolution at the electrodes. The potential of the electrode with a low degree of polarization remains essentially unchanged during both the charge and discharge processes.

Figure 2:
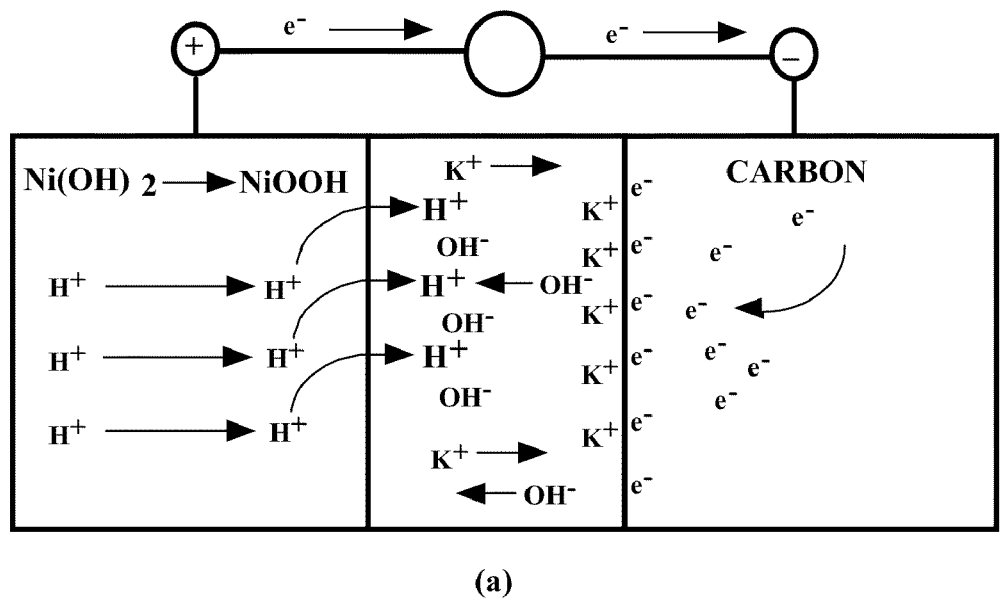
FIG. 2 is a schematic representation of the movement of ions during charge and discharge.
Figure 2:
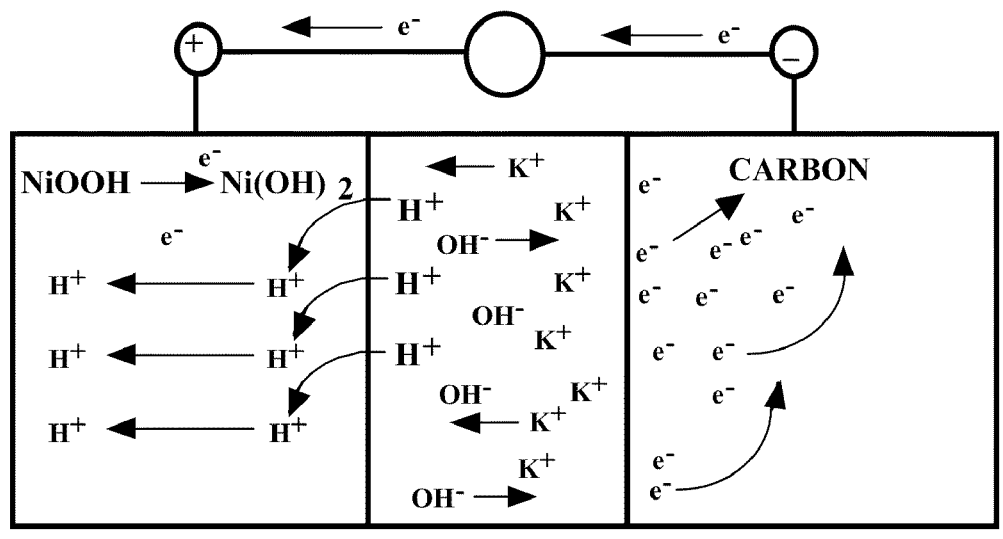

Without being bound by theory, it is expected that the general mechanism for the asymmetric capacitor is similar to that of its aqueous analog, with faradaic processes occurring at the manganese electrode and double-layer charging at the carbon electrode. This is illustrated in FIG. 2, which shows the movement of ions during charge and discharge of an asymmetric supercapacitor containing manganese and carbon in aqueous KOH. During charge, protons from the polarized manganese electrode are ejected and move into the electrolyte (deprotonization) while an electric double layer consisting of hydrated K ions forms on the carbon electrode. This process operates in reverse during discharge.

Figure 3:
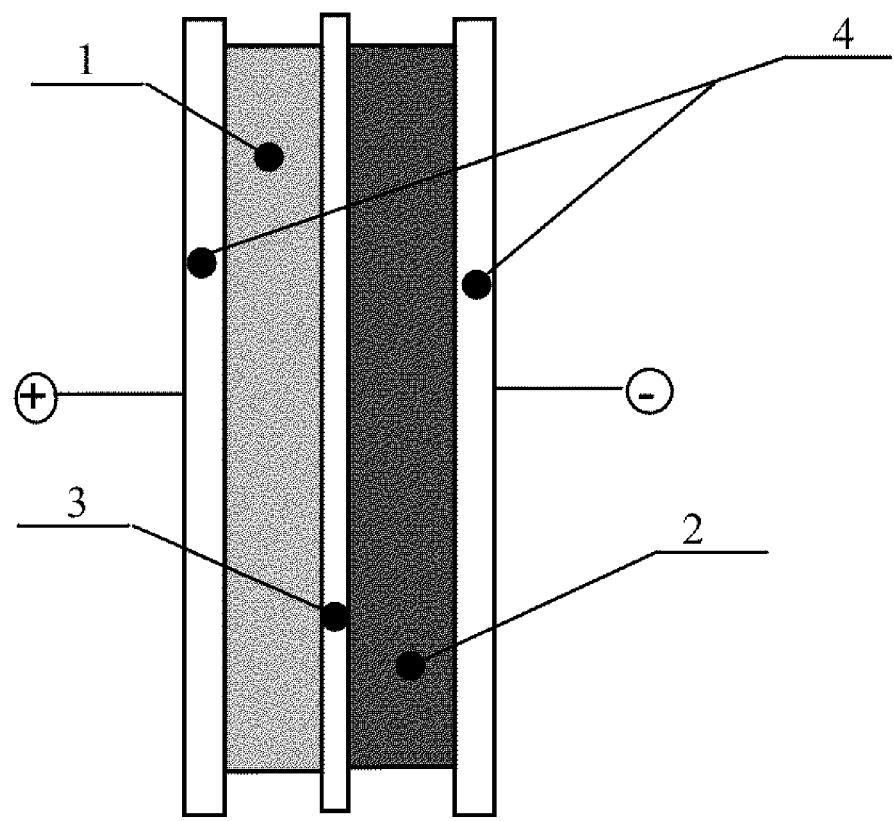
FIG. 3 is a schematic representation of an asymmetric supercapacitor.

FIG. 3 is a schematic representation of a supercapacitor. 1 is the active material for the positive electrode, 2 is the active material for the negative electrode, 3 is the separator and 4 are the current collectors. The electrolyte is dispersed throughout the separator and electrodes.

Although carbonaceous materials are low cost and chemically stable materials for use in the negative electrode, other active materials can be used in addition to or to replace the carbonaceous material. Examples of other active negative electrode materials include a negative electrode comprising at least one material selected from the group consisting of a carbonaceous active material, Zn, Al, Mg, Ca, Cr, La, V, Ti, Li, Na; a metal oxide of formula $MO_x$, where $0<x<3$ and M is at least one selected from the group consisting of Ti, V, Nb, Cr, Mo, W, Mn, Fe, Co, Ni, Pd, Pt, Cu and Ag; a sulfide of formula $MS_x$, where x is from 1 to 10 and M is at least one selected from the group consisting of Co, Ni, Fe, Cu, Ag, Mo and W; $Li_xMoO_{(6-x)/2}$ where x and y are greater than zero and less than 1 and a conductive polymer. Examples of yet other active materials include, but are not limited to, electrically conductive polymers, metals, metal oxides, metal nitrides, other metal sulfides, and combinations comprising at least one of the foregoing active materials. Examples of suitable electrically conductive polymers include, but are not limited to, polyacetylene, polypyrrole, polyaniline, polythiophene, and a combination comprising at least one of the foregoing polymers. Such electrically conductive polymers can also be used in the current collector of the positive electrode. Examples of suitable metals include, but are not limited to, manganese, iron, zinc, cobalt, nickel, copper, zinc, ruthenium, iridium, palladium, silver, platinum and a combination comprising at least one of the foregoing metals. Examples of suitable metal oxides include, but are not limited to, ruthenium oxide, iridium oxide, copper oxide, nickel oxides; indium oxide, tin oxide, and a combination comprising at least one of the foregoing metal oxides. Examples of suitable metal nitrides include, but are not limited to, titanium nitride, vanadium nitride, and a combination comprising at least one of the foregoing metal nitrides. Examples of suitable metal sulfides include, but are not limited to, iron disulfide, cobalt sulfide, nickel sulfide, silver sulfide, and a combination comprising at least one of the foregoing metal sulfides.

In an embodiment in which the asymmetric supercapacitor comprises an aqueous electrolyte solution, examples of electrolytes besides aqueous solutions of alkali metal hydroxides and carbonates include, but are not limited to, aqueous solutions of chlorides of alkali metals, aqueous solutions of iodides of alkali metals, aqueous solutions of bromides of alkali metals, aqueous solutions of sulfates of alkali metals, aqueous solutions of nitrates of alkali metals, and a combination comprising at least one of the foregoing aqueous solutions.

In an embodiment in which the asymmetric supercapacitor comprises a non-aqueous ionic conducting electrolyte, examples of suitable electrolytes include, but are not limited to an inorganic-based solution comprising a solvent and a salt, an organic-based solution comprising a solvent and a salt, or a combination comprising at least one of the foregoing solutions. The inorganic solvent can be selected from the group consisting of $SOCl_2$, $SO_2$, $NH_3$, and a combination comprising at least one of the foregoing solvents. The salt of the inorganic solution can be selected from the group consisting of $LiAlCl_3$, $LiAlF_3$, $LiPF_6$, $LiBF_4$, $[N(CH_3CH_2)_4]BF_4$, bis(trifluoromethanesulfonyl)imide, and a combination comprising at least one of the foregoing salts. The organic solvents can be selected from the group consisting of propylene carbonate (PC), ethylene carbonate (EC), butylene carbonate (BC), dimethyl carbonate (DMC), diethyl carbonate (DEC), ethyl methyl carbonate (EMC), methyl propyl carbonate (MPC), acetonitrile ($CH_3CN$), and a combination comprising at least one of the foregoing solvents. The salt of the organic solution can be selected from the group consisting of $LiAlCl_3$, $LiAlF_3$, $LiPF_6$, $LiBF_4$, $[N(CH_3CH_2)_4]BF_4$, bis(trifluoromethanesulfonyl)imide, and a combination comprising at least one of the foregoing salts.

In an embodiment in which the asymmetric supercapacitor comprises a solid electrolyte, the solid electrolyte can be a polymer. Examples of suitable polymers include, but are not limited to, polyethylene oxide, polyacrylate, polystyrene, and a combination comprising at least one of the foregoing polymers. Examples of other suitable solid electrolytes include, but are not limited to proton exchange membranes and anion exchange membranes.

The invention is further illustrated by the following non-limiting examples.

EXAMPLE

A layered double hydroxide (LDH) active material was prepared by co-precipitation and the simultaneous addition/ mixing of metal nitrates and a base solution (NaOH+ Na$_2$CO$_3$) at constant pH (8-10). The resulting product was subsequently aged and crystallized in the synthesis solution overnight (75° C.), and then isolated by centrifuging/decanting and washing until free of Na$^+$. The material was dried and ground using a mortar and pestle. A series of layered double hydroxide compositions were prepared and given in table 1.

TABLE 1

| Composition | Aging temp. (° C.) | Aging time (h) | BET surface area (m$^2$/g) | Pore volume (cm$^3$/g) | Mean crystallite size (nm) |
|---|---|---|---|---|---|
| [Co$_{0.40}$Ni$_{0.29}$Al$_{0.31}$(OH)$_2$](CO$_3$)$_{0.165}$ | 75 | 24 | 52.6 | 0.390 | 20.9 |
| [Co$_{0.36}$Ni$_{0.24}$Al$_{0.4}$(OH)$_2$](CO$_3$)$_{0.2}$ | 22 | 2 | 142 | 0.53 | 6.1 |
| [Co$_{0.39}$Ni$_{0.27}$Al$_{0.34}$(OH)$_2$](CO$_3$)$_{0.17}$ | 75 | 21 | 115 | 0.6 | 9.2 |
| [Co$_{0.29}$Ni$_{0.19}$Zn$_{0.15}$Al$_{0.39}$(OH)$_2$](CO$_3$)$_{0.185}$ | 75 | 20 | 82 | 0.75 | 12.6 |
| [Co$_{0.21}$Ni$_{0.14}$Zn$_{0.3}$Al$_{0.34}$(OH)$_2$](CO$_3$)$_{0.17}$ | 75 | 20 | 75 | 0.734 | 12.9 |

Figure 4:
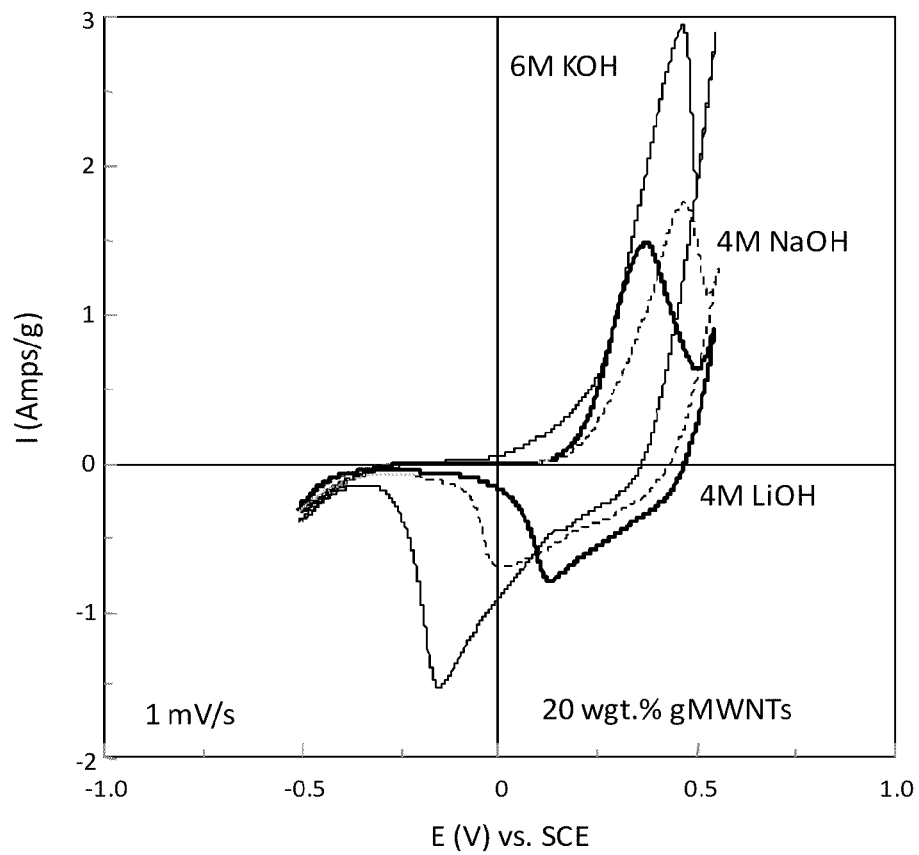
FIG. 4 is a plot for $[Co_{0.36}Ni_{0.24}Al_{0.4}(OH)_2](CO_3)_{0.2}$ in selected electrolytes.
Figure 5:
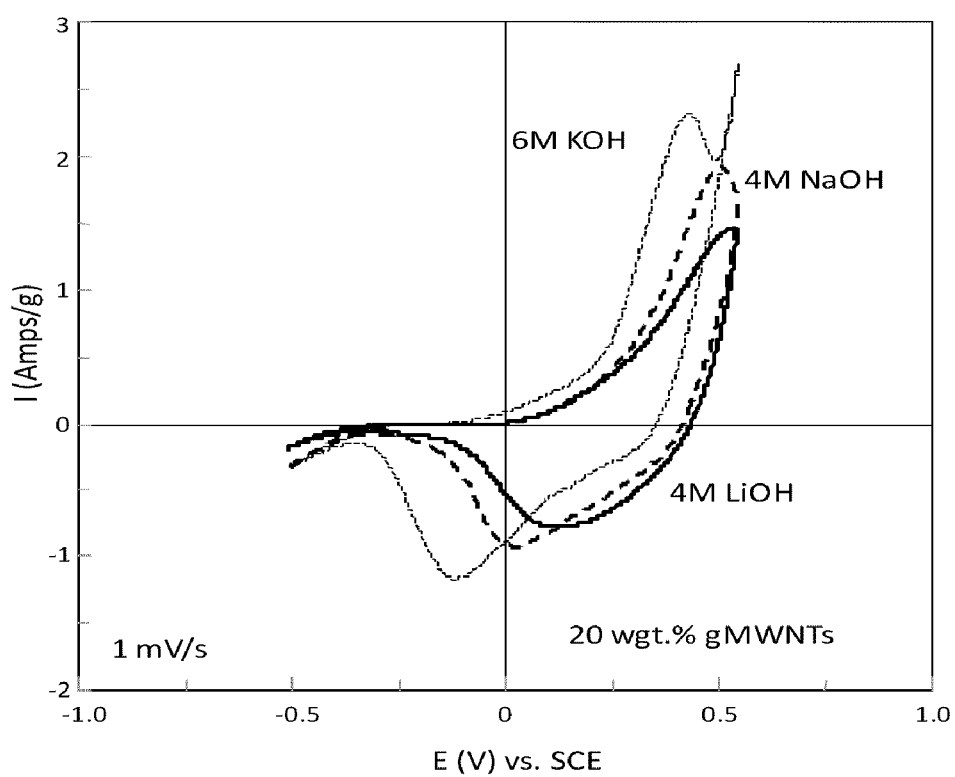
FIG. 5 is a cyclic voltamogram plot for heat-treated $[Co_{0.36}Ni_{0.24}Al_{0.4}(OH)_2](CO_3)_{0.2}$ in selected electrolytes.
Figure 6:
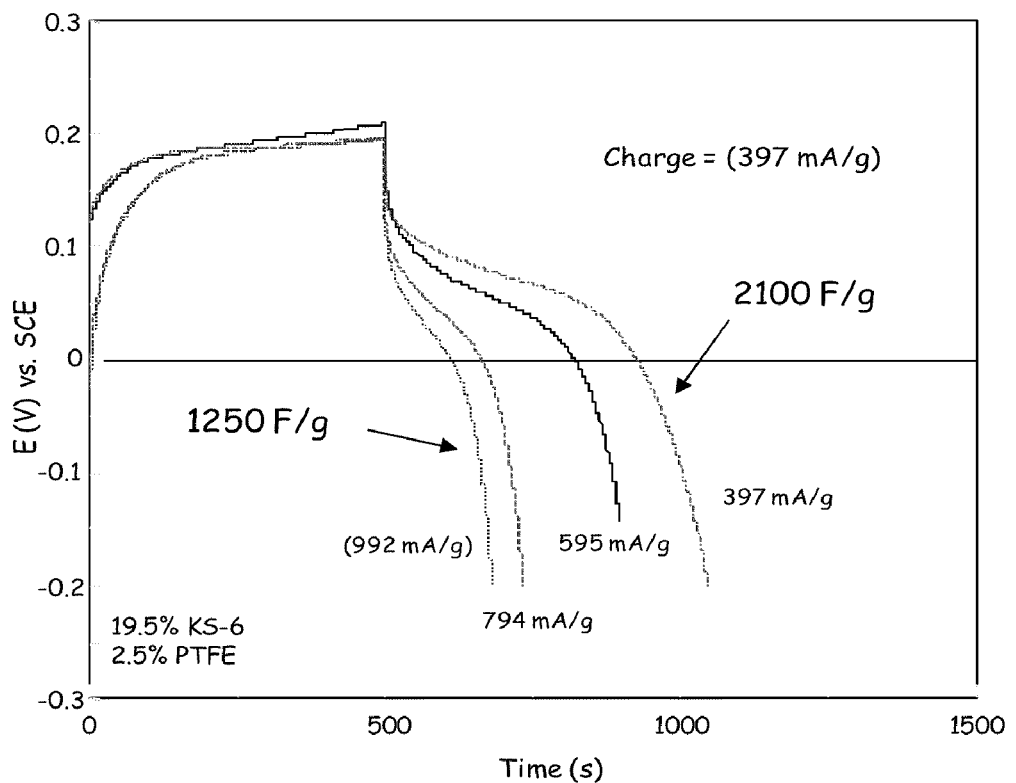
FIG. 6 shows constant charge and discharge performance of $[Co_{0.4}Ni_{0.29}Al_{0.31}(OH)_2](CO_3)_{0.155}$ in 4.8 n KOH.

A sample of [Co$_{0.36}$Ni$_{0.24}$Al$_{0.4}$(OH)$_2$](CO$_3$)$_{0.2}$ was prepared into an electrode by mixing it with 20 wt. % multiwall carbon nanotubes (MWNTs) and 3 wt. % PTFE (Dupont type 6C). The materials are mixed with a mortar and pestle and rolled into a sheet. 12 mm diameter electrodes were punched from the sheet and pressed onto nickel mesh screen current collectors. Half-cell measurements in various electrolytes (6M KOH, 4M LiOH) were conducted on as-prepared layered double hydroxides using cyclic voltammetry (CV). Carbon rod and saturated calomel electrode (SCE) served as the counter and reference electrodes, respectively. Results of the CV experiments are shown in FIG. 4. A series of cyclic voltammograms for [Co$_{0.36}$Ni$_{0.24}$Al$_{0.4}$(OH)$_2$](CO$_3$)$_{0.2}$ after heat treatment at 160 C. for 5 hours in air are shown in FIG. 5 in various electrolytes. FIG. 6 shows the constant current charge and discharge behavior for a [Co$_{0.4}$Ni$_{0.29}$Al$_{0.31}$(OH)$_2$](CO$_3$)$_{0.155}$ in 6M KOH at different discharge rates. The layered double hydroxide was mixed with 2.5 wgt % PTFE (Dupont 6C) and 19.5 wgt. % graphite (Lonza KS6). The pseudocapacitance of the LDH results from injection of H$^+$ into/out of lattice similar to Ni(OH)$_2$—NiOOH redox couple. Respectable, high rate performance is demonstrated for the LDH due to high proton mobility.

Figure 7A:
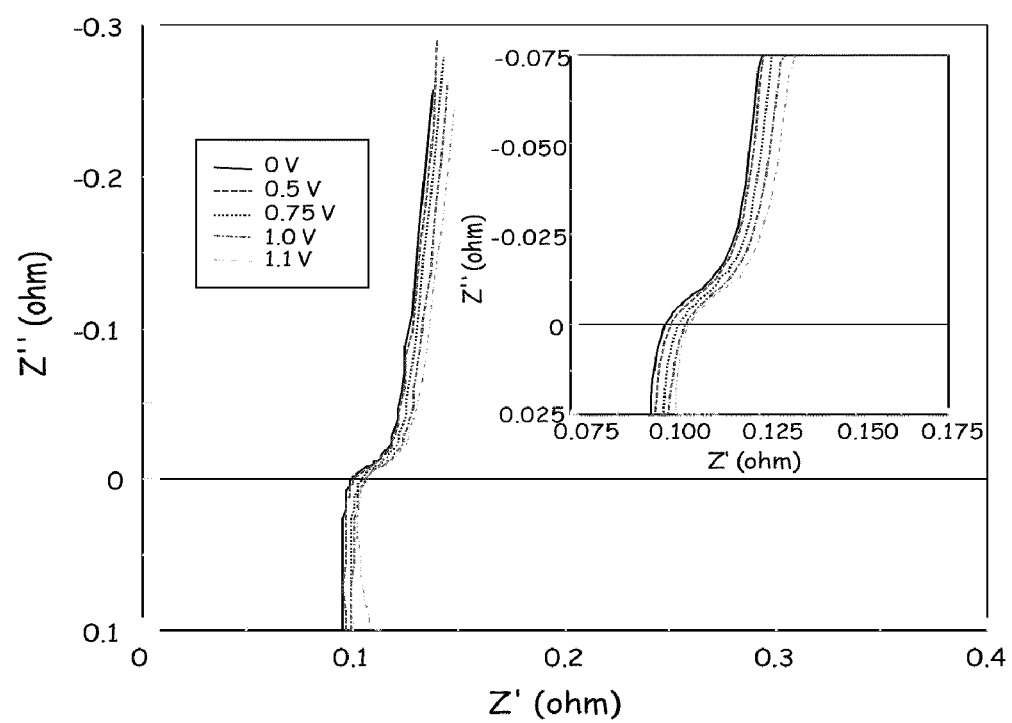
FIG. 7A shows Nyquist plots at various charge voltages for an asymmetric capacitor prepared from $[Co_{0.36}Ni_{0.24}Al_{0.4}(OH)_2](CO_3)_{0.2}$ positive electrodes and activated carbon negative electrodes in 4.8 M KOH.
Figure 7B:
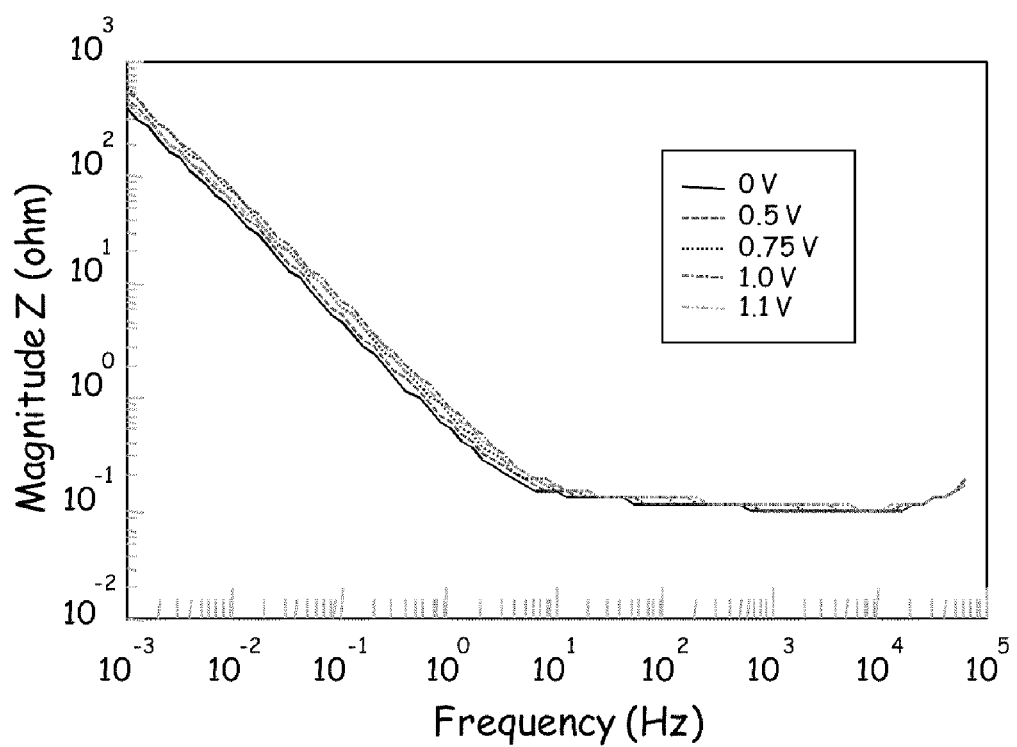
FIG. 7B is a Bode magnitude plot at various charge voltages for an asymmetric capacitor prepared from $[Co_{0.36}Ni_{0.24}Al_{0.4}(OH)_2](CO_3)_{0.2}$ positive electrodes and activated negative electrodes in 4.8 M KOH.

An asymmetric capacitor using a LDH as the positive and activated carbon as the negative electrodes was assembled using 4.8M KOH as the electrolyte. The positive electrode contained [Co$_{0.36}$Ni$_{0.24}$Al$_{0.4}$(OH)$_2$](CO$_3$)$_{0.2}$ with 20 wgt. % carbon black and 3wgt. % PTFE (Dupont 6C). Impedance spectra for the assembled asymmetric capacitor device are shown in FIGS. 7a and 7b in the form of Nyquist and Bode magnitude plots, respectively. The device shows typical capacitive behavior expected.

FIG. 4 shows representative cyclic voltammograms for the as-prepared layered double hydroxide (LDH), [Co$_{0.36}$Ni$_{0.24}$Al$_{0.4}$(OH)$_2$](CO$_3$)$_{0.2}$ in different aqueous KOH electrolytes containing various cations. The LDH materials were mixed with 20 wgt. % MWNTs and 3 wgt. % PTFE. The sweep rate was 1 mV/s. A SCE was used as a reference electrode. For each electrolyte, the LDH shows both oxidation and reduction waves reminciscent of faradaic charge and discharge found in typical active positive materials used in secondary batteries. The LDH shows the largest faradaic capacity in the KOH electrolyte (greatest area under the cyclic voltammograms for the oxidation and reduction peaks). Comparable (but lower than for KOH) capacities were obtained for the other electrolytes, LiOH and NaOH. The charge and discharge reversibility were highest for the LiOH electrolyte. That is, the oxidation and reduction waves or peaks showed the smallest $\Delta E$ separation.

FIG. 5 shows representative cyclic voltammograms for layered double hydroxide (LDH), [Co$_{0.36}$Ni$_{0.24}$Al$_{0.4}$(OH)$_2$](CO$_3$)$_{0.2}$ in different aqueous KOH electrolytes containing various cations but after heat-treated at 160° C. for 5 h in air. The LDH materials were mixed with 20 wgt. % MWNTs and 3 wgt. % PTFE. The sweep rate was 1 mV/s. A SCE was used as a reference electrode. As with the as-prepared LDH materials (FIG. 4), the LDH materials show both oxidation and reduction waves reminicent of faradaic charge and discharge found in typical active positive materials used in secondary batteries. The heat-treated LDH shows the largest faradaic capacity in KOH electrolyte, followed by NaOH and LiOH which showed the lowest capacity (or area under the voltammograms). The capacity for the heat-treated LDH in KOH is lower than the capacity of the same as-prepared (non-heat treated material), FIG. 4. The shape of the oxidation waves for the heat-treated LDH have also changed when compared to the as-prepared LDH (FIG. 4) suggesting that the oxygen overvoltage (or onset E for oxygen evolution) has changed for the materials after heat treatment.

FIG. 6 shows as-prepared [Co$_{0.4}$Ni$_{0.29}$Al$_{0.31}$(OH)$_2$](CO$_3$)$_{0.155}$ LDH (no heat treatment). The electrode was prepared by mixing the LDH material with 19.5 wgt. % KS-6 and 2.5 wgt. % PTFE. The electrolyte was 6M KOH. A SCE was used as a reference electrode. In all cases, the LDH electrode was charged using the same current, 397 mA/g). The electrode was then discharged using 4 different currents (397, 595, 794 and 992 mA/g). All specific currents are reported as per gram of LDH active material only. The discharge capacity (mAh/g) of the electrode was measured after each discharge rate and converted to F/g. In general, the discharge voltage profiles are similar to those of battery-type faradaic materials, as expected. As the discharge current increased, the time to discharge (or capacity) of the electrode decreased, again as expected. In general, the LDH showed respectable high rate performance and can be attributed to high proton mobility from injection of H$^+$ into/out of lattice similar to the Ni(OH)$_2$—NiOOH redox battery couple. The voltage drop (IR) for the LDH was also relatively high at about 80 mV and is likley due to the poor electronic conductivity of as-prepared LDH material. In all cases (discharge rates), the LDH showed pseudo-capacitances exceeding 1000 F/g. It should be noted and with the exception of the lowest discharge rate used (397 mA/g), the charge rate (and resulting charge coulombs, i.e., charge current×charge time (500 s)) was less than the discharge rate. In these cases, the LDH still showed excellent discharge capacity.

FIG. 7a shows the complex plane impedance behavior of an asymmetric LDH/KOH/activated carbon capacitor. The LDH was as-prepared [Co$_{0.4}$Ni$_{0.29}$Al$_{0.31}$(OH)$_2$](CO$_3$)$_{0.155}$ with no heat treatment. The positive LDH electrode was prepared by mixing the material with 20 wgt. % carbon black and 3 wgt. % PTFE. The negative electrode was a commercial activated carbon and contained 2 times the active mass of the positive LDH electrode. The electrolyte was 4.8 M KOH. The asymmetric capacitor was charged and held at various constant voltages, 0.5, 0.75, 1.0 and 1.1V. After charging the asymmetric capacitor at each specified voltage, impedance spectra were obtained and recorded. The asymmetric capacitor was also tested at 0V or full discharge condition. The resulting impedance spectra are shown for each voltage condition. In general, the complex plane impedance show expected double-layer charge storage with typical diffusion and charge saturation regions. The data show that as the asymmetric capacitor is charged to higher voltages, the ESR (equivalent series resistance) of the device increases accordingly, again, as expected. The maximum ESR for this device was on the order of 120 milliohm.

FIG. 7b shows the corresponding Bode magnitude impedance for the data obtained in FIG. 7a. Again, these data were obtained for the asymmetric LDH/KOH/activated carbon capacitor. As expected, the Bode magnitude shows typical double-layer capacitive behavior at each charge voltage.

As can be seen by the foregoing description and examples the asymmetric supercapacitor described herein exhibits improved energy and power density when compared to asymmetric supercapacitor. Additionally the asymmetric supercapacitor provides the improved energy and power density in a cost effective manner.

While preferred embodiments have been shown and described, various modifications and substitutions may be made thereto without departing from the spirit and scope of the invention. Accordingly, it is to be understood that the present invention has been described by way of illustration and not limitation.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof

We claim:

1. An asymmetric supercapacitor comprising
   a positive electrode comprising a current collector and a first active material selected from the group consisting of a layered double hydroxide of formula $[M^{2+}_{1-x}N^{3+}_x(OH)_2]A^{n-}_{x/n} \cdot mH_2)$ where $M^{2+}$ is at least one divalent metal, $N^{3+}$ is at least one trivalent metal and/or a non-metal and A is an anion of charge n−, where x and y are greater than zero and less than 1 and n is 1, 2, 3, or 4; $LiCoO_2$, $LiCo_xNi_yO_2$, $LiCo_xNi_yMn_{(1-x-y)}O_2$ where x and y are greater than zero and less than 1; sulfides of formula $MS_x$ where x is from 1 to 10 and M is at least one selected from the group consisting of Co, Ni, Fe, Cu, Ag, Mo and W; $Li_xCo_y(PO_4)_z$ and $Li_xNi_y(PO_4)_z$ where x, y and z are greater than zero and less than 1; activated carbon and graphite and a combination comprising at least one of the foregoing active materials:
   a negative electrode comprising at least one material selected from a carbonaceous active material, Zn, Al, Mg, Ca, Cr, La, V, Ti, Li, Na; a metal oxide of formula $MO_x$, where $0<x<3$ and M is at least one selected from the group consisting of Ti, V, Nb, Cr, Mo, W, Mn, Fe, Co, Ni, Pd, Pt, Cu and Ag; a sulfide of formula $MS_x$, where x is from 1 to 10 and M is at least one selected from the group consisting of Co, Ni, Fe, Cu, Ag, Mo and W; $Li_xMoO_{6-x)/2}$ where x and y are greater than zero and less than 1 and a conductive polymer:
   a solid electrolyte or an aqueous electrolyte solution selected from the group consisting of aqueous solutions of hydroxides of alkali metals, aqueous solutions of carbonates of alkali metals, aqueous solutions of chlorides of alkali metals, aqueous solutions of bromides of alkali metals, aqueous solutions of iodides of alkali metals, aqueous solutions of sulfates of alkali metals, aqueous solutions of nitrates of alkali metals, and a combination comprising at least one of the foregoing aqueous solutions or a non-aqueous ionic conducting electrolyte solution containing a salt and a non-aqueous solution: and
   a separator plate.

2. The asymmetric supercapacitor of claim 1, wherein the negative electrode further comprises another current collector and a second active material selected from the group consisting of a conductive polymer, a metal, a metal oxide, a metal nitride, a metal sulfide, and a combination comprising at least one of the foregoing active materials.

3. The asymmetric supercapacitor of claim 2, wherein the another current collector is selected from the group consisting of a metal foil, a metal mesh, an electrically conductive polymer composite, and an expanded metal.

4. The asymmetric supercapacitor of claim 2, wherein the another current collector comprises a conductive polymer selected from the group consisting of polyacetylene, polypyrrole, polyaniline, polythiophene, and a combination comprising at least one of the foregoing polymers.

5. The asymmetric supercapacitor of claim 2, wherein the conductive polymer is selected from the group consisting of polyacetylene, polypyrrole, polyaniline, polythiophene, and a combination comprising at least one of the foregoing polymers.

6. The asymmetric supercapacitor of claim 2, wherein the metal of the negative electrode is selected from the group consisting of manganese, iron, zinc, cobalt, nickel, cupper, zinc, ruthenium, iridium, palladium, silver, platinum, and a combination comprising at least one of the foregoing metals.

7. The asymmetric supercapacitor of claim 2, wherein the metal oxide of the negative electrode is selected from the group consisting of ruthenium oxide, iridium oxide, cupper oxide, nickel oxide; indium oxide, tin oxide, and a combination comprising at least one of the foregoing metal oxides.

8. The asymmetric supercapacitor of claim 2, wherein the metal nitride of the negative electrode is selected from the group consisting of titanium nitride, vanadium nitride, and a combination comprising at least one of the foregoing metal nitrides, and wherein the metal sulfide of the negative electrode is selected from the group consisting of iron disulfide, cobalt sulfide, nickel sulfide, silver sulfide, and a combination comprising at least one of the foregoing metal sulfides.

9. The asymmetric supercapacitor of claim 1, wherein the asymmetric supercapacitor contains a carbonaceous active material and the carbonaceous active material comprises a nanofibrous material, a carbon nanotube, a graphite material, and a combination comprising at least one of the foregoing materials.

10. The asymmetric supercapacitor of claim 9, wherein the carbonaceous active material comprises discrete carbon fibers less than about 10 micrometers in diameter.

11. The asymmetric supercapacitor of claim 10, wherein the carbonaceous active material comprises carbon fibers less than about 100 nm in diameter.

12. The asymmetric supercapacitor of claim 9, wherein the carbonaceous active material is a non-woven mat, a woven cloth, or a two dimensional sheet comprising a carbonized polymer.

13. The asymmetric supercapacitor of claim 1, wherein the negative electrode has a thickness about 50 micrometers to about 375 micrometers.

14. The asymmetric supercapacitor of claim 1, wherein the negative electrode further comprises a collection coating.

15. The asymmetric supercapacitor of claim 1, wherein the first active material is nanostructured.

16. The asymmetric supercapacitor of claim 1, wherein the positive electrode further comprises a binder.

17. The asymmetric supercapacitor of claim 1, wherein the current collector is selected from the group consisting of a metal foil, a metal mesh, an electrically conductive polymer composite, and an expanded metal.

18. The asymmetric supercapacitor of claim 1, wherein the positive electrode thickness is less than about 250 micrometers.

19. The asymmetric supercapacitor of claim 1, wherein the non-aqueous ionic conducting electrolyte solution comprises a solvent and a salt, wherein the solvent is selected from the group consisting of $SOCl_2$, $SO_2$, $NH_3$, and a combination comprising at least one of the foregoing solvents, and wherein the salt is selected from the group consisting of $LiAlCl_3$, $LiAlF_3$, $LiPF_6$, $LiBF_4$, $[N(CH_3CH_2)_4]BF_4$, bis(trifluoromethanesulfonyl)imide, and a combination comprising at least one of the foregoing salts.

20. The asymmetric supercapacitor of claim 1, wherein the non-aqueous ionic conducting electrolyte solution comprises a solvent and a salt, wherein the solvent is selected from the group consisting of PC, EC, BC, DMC, DEC, EMC, MPC, $CH_3CN$, and a combination comprising at least one of the foregoing solvents, and wherein the salt is selected from the group consisting of $LiAlCl_3$, $LiAlF_3$, $LiPF_6$, $LiBF_4$, $[N(CH_3CH_2)_4]BF_4$, bis(trifluoromethanesulfonyl)imide, and a combination comprising at least one of the foregoing salts.

21. The asymmetric supercapacitor of claim 1, wherein the solid electrolyte is a polymer selected from the group consisting of a polyethylene oxide, a polyacrylate, a polystyrene, and a combination comprising at least one of the foregoing polymers.

22. The asymmetric supercapacitor of claim 21, wherein the solid electrolyte is a proton exchange membrane.

23. The asymmetric supercapacitor of claim 21, wherein the solid electrolyte is an anion exchange membrane.

24. The asymmetric supercapacitor of claim 1, wherein the divalent metal $M^{2+}$ is at least one selected from the group consisting of $Co^{2+}$, $Mg^{2+}$, $Mn^{2+}$, $Fe^{2+}$, $Co^{2+}$, $Ni^{2+}Cu^{2+}$ and $Zn^{2+}$ wherein the trivalent metal $N^{3+}$ is at least one selected from the group consisting of $Al^{3+}$, $B^{3+}$, $Mn^{3+}$, $Fe^{3+}$, $Co^{3+}$, $Ni^{3+}$, $Cr^{3+}$, $Ga^{3+}$, $Y^{3+}$, $La^{3+}$, $Ce^{3+}$ and $Ti^{3+}$.

* * * * *